(12) United States Patent
Broderick et al.

(10) Patent No.: US 11,043,190 B1
(45) Date of Patent: Jun. 22, 2021

(54) SYNCHRONIZING A USER DEVICE AND A KIOSK INTERFACE USING A VISUAL CODE, AND APPLICATIONS THEREOF

(71) Applicant: Infinite Peripherals, Inc., Irvine, CA (US)

(72) Inventors: John Broderick, Corona, CA (US); Brad Schuran, St. Catharines (CA); Jeffrey Lee Scott, Irvine, CA (US)

(73) Assignee: Infinite Peripherals, Inc., Irvine, CA (US)

( * ) Notice: Subject to any disclaimer, the term of this patent is extended or adjusted under 35 U.S.C. 154(b) by 0 days.

(21) Appl. No.: 17/011,458

(22) Filed: Sep. 3, 2020

(51) Int. Cl.
| | |
|---|---|
| *G09G 5/12* | (2006.01) |
| *G06K 7/14* | (2006.01) |
| *G06F 1/12* | (2006.01) |
| *H04L 7/00* | (2006.01) |
| *H04L 29/08* | (2006.01) |
| *G06F 21/64* | (2013.01) |

(52) U.S. Cl.
CPC .............. *G09G 5/12* (2013.01); *G06F 1/12* (2013.01); *G06F 21/64* (2013.01); *G06K 7/1417* (2013.01); *H04L 7/0008* (2013.01); *H04L 67/141* (2013.01); *G09G 2354/00* (2013.01); *G09G 2370/022* (2013.01)

(58) Field of Classification Search
CPC .................................. G06F 21/64; G06F 1/12
See application file for complete search history.

(56) References Cited

U.S. PATENT DOCUMENTS

| | | | | |
|---|---|---|---|---|
| 2015/0356801 | A1* | 12/2015 | Nitu | G07C 9/00904 340/5.61 |
| 2019/0364158 | A1* | 11/2019 | Curry | H04N 1/00167 |
| 2020/0302043 | A1* | 9/2020 | Vachon | G06F 21/32 |
| 2020/0349543 | A1* | 11/2020 | Gilbert | G06Q 20/18 |

* cited by examiner

*Primary Examiner* — David E Choi
(74) *Attorney, Agent, or Firm* — Sterne, Kessler, Goldstein & Fox P.L.L.C.

(57) ABSTRACT

A user can scan a QR code on a kiosk with her mobile device. Scanning the QR code will cause the mobile device to display an interface displayed on the kiosk. When a user enters information on the device corresponding information is displayed on the kiosk. In this way, a user can engage with the kiosk interface in a contactless manner.

15 Claims, 9 Drawing Sheets

SYNCHRONIZING A USER DEVICE AND A KIOSK INTERFACE USING A VISUAL CODE, AND APPLICATIONS THEREOF

BACKGROUND

Field

This field is generally related to interfacing with a kiosk computing device.

Related Art

A kiosk computing device is a computer terminal with specialized hardware and software that provides access to information and applications for communication, commerce, entertainment, or education. They are built into a small structure in a public area and are used for providing and collecting information. Examples include communication and videoconferencing kiosks, financial services kiosks (e.g., Automated Teller Machines), photobook kiosks, Internet kiosks, ticketing kiosks, restaurant kiosks, visitor management and security kiosks, building directory and way-finding kiosks, hospital and medical clinic registration kiosks, self-checkout kiosks, credit card entry kiosks, and information kiosks.

Kiosk computing devices are typically placed in high foot traffic settings such as shops, hotel lobbies or airports. Given their public nature, often kiosks can be used by many people. They typically have inputs such as buttons and touchscreens that require users to contact them to interact with them.

Infectious diseases, such as cold, flu, and COVID-19, are often spread through contact with shared services. When a person touches a service, she may leave behind particles containing bacteria or viruses. When the next person touches the same surface, the particles may spread to her hand, and her hand may further contact her nose or mouth, possibly causing transmission of a respiratory illness.

To prevent transmission of disease, some mobile device applications allow for touchless interaction with an application. These mobile applications are specially designed for interaction with a particular kiosk application. This requires special development to be done for each application.

Improved systems and methods are needed to allow for touchless access to a kiosk that is more flexible without requiring specialized software to be installed on the mobile device.

BRIEF SUMMARY

In an embodiment, a computer-implemented method enables contactless access to a kiosk computing device. In the method, the kiosk computing device displays a first graphical user interface including a first input field. A machine-readable optical label is generated for display on the kiosk computing device. A mobile device captures and decodes the machine-readable optical label to determine a link identifier. The mobile device requests a network resource addressed by the link identifier. In response to the request, a second graphical user interface that includes a second input field corresponding to the first input field is retrieved and presented on the mobile device. The first and second graphical user interfaces are synchronized such that, when the user enters information on the second input field in the second graphical user interface, the information appears on the first input field in the first graphical user interface and vice versa. In this manner any number of input fields can be completed by the mobile device and kept in sync between the two devices.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

In an embodiment, a user can scan a quick response (QR) code on a kiosk with her mobile device using typically pre-installed software such as the operating system camera app. Scanning the QR code will cause the mobile device to retrieve a web page stored on a server to display a similar interface as displayed on the kiosk application. The web page is presented in a browser on the user's device using typically pre-installed browser software. When a user enters information on the mobile device, corresponding information is displayed on the kiosk. In this way, a user can engage with the kiosk interface in a contactless manner using their mobile web browser, thus providing a way to touchlessly interact with a kiosk without having to install any special software. By allowing touchless interaction, embodiments may prevent spread of infectious diseases.

Figure 1:
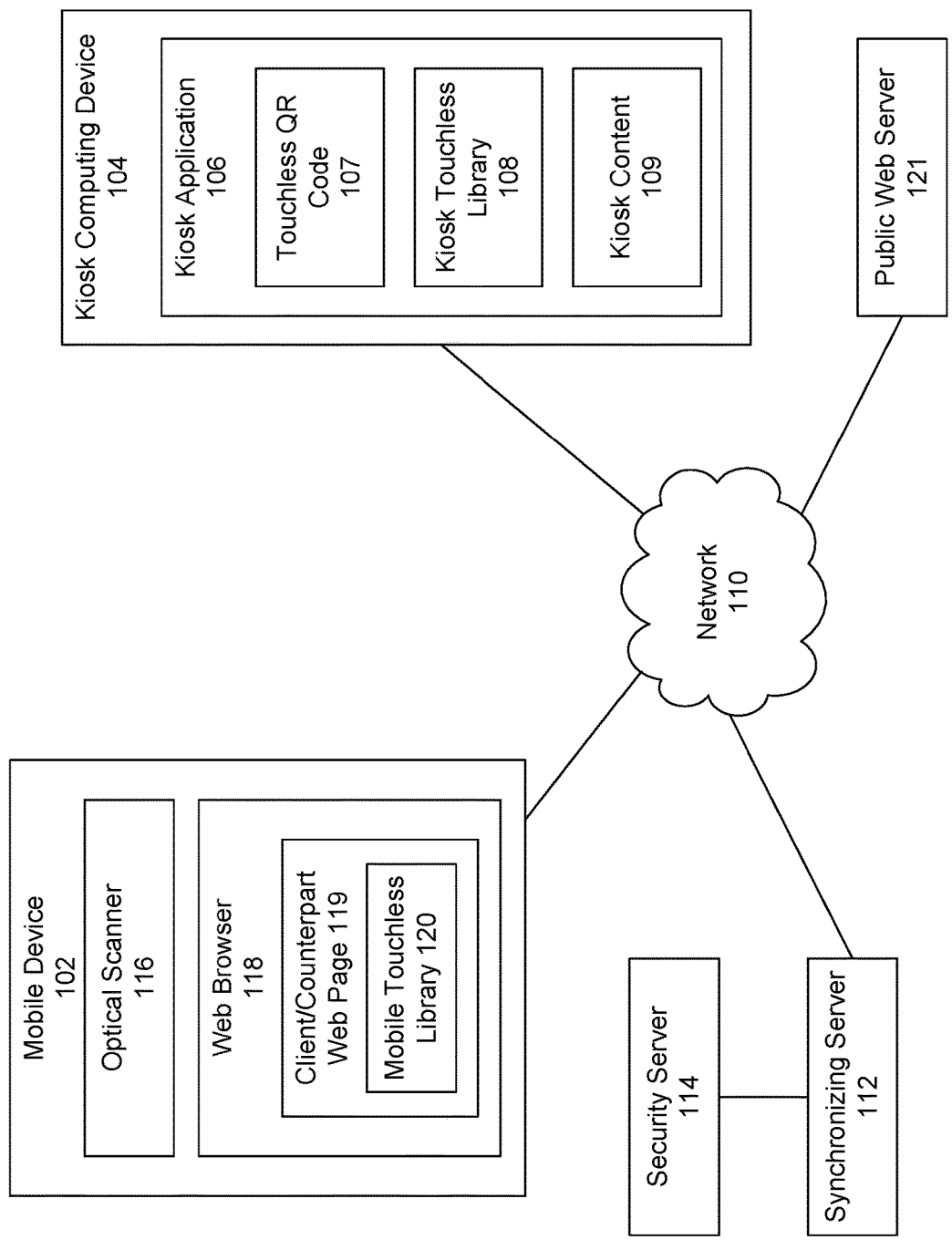
FIG. 1 illustrates a system for enabling contactless access to a kiosk computing device according to an embodiment.

FIG. 1 illustrates a system 100 for enabling contactless access to a kiosk computing device according to an embodiment. System 100 includes a mobile device 102, a kiosk computing device 104, a synchronizing server 112, and a public web server 120 coupled by a network 110.

Mobile device 102 is a computer small enough to be portable. Examples include smart phones and tablet computers. They can also include digital media players, digital cameras, wearable computers (such as smart watches and augmented/virtual reality glasses), and drones. To allow interaction with the user, these mobile devices often contain a visual output, such as an LCD or OLED screen interface. They also have user inputs such as a touchscreen or other button interfaces. These devices can typically communicate via various communication interfaces such as Wi-Fi, Bluetooth, or cellular network interfaces.

Mobile device 102 includes an optical scanner 116. Optical scanner 116 can capture an image and detect whether the image includes a machine-readable optical label such as a QR code. If it does contain a machine-readable optical label, optical scanner 116 can decode the label to determine any information embedded therein. To capture the image, optical scanner 116 may be or include an image sensor, that is, a camera, capable of capturing still images and/or video.

Mobile device 102 further includes a web browser 118. Web browser 118 can retrieve a network resource (such as a webpage) addressed by the link identifier (such as a uniform resource locator, or URL) and present the network resource for display. In particular, web browser 118 is a software application for accessing information on the World Wide Web. Usually, web browser 118 makes this request using the hypertext transfer protocol (HTTP or HTTPS). When a user requests a web page from a particular website, the web browser retrieves the necessary content from a web server, interprets and executes the content, and then displays the page on a display on mobile device 102 shown as client/counterpart web page 119. In examples, the content may have HTML and client-side scripting, such as JavaScript. Once displayed, a user can input information and make selections on the page, which can cause web browser 118 to make further requests.

As mentioned above, mobile device 102 is connected to a synchronizing server 112 which is also connected to the kiosk computing device 104 via a network 110. Network 110 is a group of computers that use a set of common communication protocols over digital interconnections for the purpose of sharing resources located on or provided by the network nodes. Network 110 can include both public networks, such as the public cellular network, and private networks, such as corporate intranets.

Kiosk computing device 104 is a computer terminal featuring specialized hardware and software that provides access to information and applications. Kiosk computing device 104 includes a kiosk application 106. Kiosk application 106 presents kiosk content 109 for display on kiosk computing device 104. For example, kiosk application 106 may be defined an HTML page, or group of interconnected HTML pages, or a standalone application of screens that define a kiosk content 109 that kiosk computing device 104 displays to a user and uses to solicit information from the user. To solicit information, kiosk content 109 may have various input fields, such as text fields, checkboxes, radio buttons, picture boxes, or clickable buttons etc. A picture box may capture an image from a device's camera, for example, to capture a photograph of a user, driver's license, or medical ID card. The input fields may be formatted with images and text to make an appealing interface for a user. Kiosk application 106 may be a web application or, alternatively, a native application.

A kiosk touchless library 108 may be used to support kiosk application 106. Kiosk touchless library 108 may include executable software that provides functions necessary to allow contactless access to kiosk computing device 104 from mobile device 102. Kiosk touchless library 108 may be implemented in various ways, including as JavaScript libraries or Native APIs or a combination of both for Hybrid applications. In addition, a skilled artisan would recognize that kiosk touchless library 108 could be implemented as a separate component from kiosk application 106.

To allow contactless access, kiosk touchless library 108 may include software necessary to generate a machine-readable optical label, to generate a page for display on mobile device 102, and to transmit and receive data to and from mobile device 102. A brief overview of each of these functions is described in turn, before a more detailed discussion of the operation with respect to, for example, FIGS. 2A-E.

To generate the machine-readable optical label, kiosk touchless library 108 may include a commercially available QR code generator. Using the QR code generator, kiosk touchless library 108 may generate a touchless QR code 107 that encodes information needed by mobile device 102 to locate a network resource and provide contactless access. In other words, kiosk touchless library 108 may generate a QR code that is a link identifier. The QR code may also encode information needed to help maintain security, such as a security token (not shown). The security token may be a random number or an encrypted random number that could be used to encrypt and decrypt messages sent from the mobile device 102 to the kiosk computing device 104 and vice versa by way of the synchronizing server 112.

To generate a page for display on mobile device 102, kiosk touchless library 108 may be used to generate a version of the content presented by the kiosk application 106 that is reformatted for different screen or input capabilities that mobile device 102 may have with kiosk computing device 104. For example, mobile device 102 may have a different screen size and/or orientation than kiosk computing device 104. Kiosk content 109 may need to be reformatted to account for the different screen size before a counterpart interface is displayed on mobile device 102. In addition, mobile device 102 and kiosk computing device 104 may have different input capabilities. For example, kiosk computing device 104 may have physical keyboard, attached payment devices, or button inputs which are other input devices that are not present on mobile device 102. Such inputs may need to be emulated on-screen. Kiosk touchless library 108 may need to alter the kiosk content to be presented in client/counterpart web page 119 to account for the different input capabilities between mobile device 102 and kiosk computing device 104. The mobile device 102 may also support features that the kiosk computing device 104 does not, including ADA-508 input improvements for people with disabilities, such as high-contrast capabilities or voice-over capabilities for the visually impaired. The client/counterpart web page 119 displayed by mobile device 102 can be generated by the kiosk touchless library 108, pre-generated by the kiosk touchless library 108, or separately authored altogether. To transmit events to mobile device 102, kiosk touchless library 108 may provide JavaScript that interacts with a document object model of kiosk application 106. The kiosk touchless library 108 may similarly provide native libraries functions to support a native kiosk application 106. For example, kiosk touchless library 108 may periodically or intermittently check the document object model to determine what data a user has inputted into various input fields on kiosk application 106. If new data has been detected, kiosk touchless library 108 may send a message across network 110 to mobile device 102 to update a counterpart field displayed on mobile device 102 by way of synchronizing server 112 (below).

Conversely, mobile touchless library 121 may receive information input into the counterpart fields on mobile device 102. When the client/counterpart web page 119 was generated or authored, it may have included its own client-side touchless library (discussed further below) that includes its own message passing capabilities to send and receive messages from the kiosk computing device 104. That client/counterpart web page 119 will evaluate the document object model on mobile device 102 to determine whether a user has updated information on the counterpart form. When the updates are made, mobile device 102 transmits a message to kiosk computing device 104 by way of the mobile touchless library 121 and the synchronizing server 112 via network 110. Kiosk touchless library 108 receives and evaluates the message. In response to message, kiosk touchless library 108 may update a counterpart field on kiosk application 106 to include the newly input information.

Public web server 120 acts to serve a client/counterpart web page 119 that embodies enough information to setup a secure communication session between the mobile device 102 and kiosk computing device 104 via the synchronization server 112. Once a secure communication session (described below) is established, kiosk touchless library 108 and mobile touchless library 121 will allow point-to-point encrypted messaging.

Client/counterpart web page 119 may include the necessary UI components, or the UI components may be sent directly from the kiosk application 106 using kiosk touchless library 108 and the aforementioned communication session. For example, the kiosk touchless library 108 could use reflection or other such technology to generate content for the mobile device 102 and serve by way of the synchronizing server 112 acting as an ad-hoc web server, limiting the need to duplicate public content authoring (for mobile device 102) and private content authoring (for kiosk computing device 104).

The synchronizing server 112 acts to set up a communication session between mobile device 102 and kiosk computing device 104. When touchless QR code 107 is generated by kiosk touchless library 108, it is expected to have enough information to establish a secure, one-to-one, messaging connection between the kiosk computing device 104 and the mobile device 102 that scanned the touchless QR code 107 combined with the information included within the client/counterpart web page 119 and public web server 120 resources. A skilled artisan may realize there are a many cryptographic methods including 3DES, RSA+3DES, etc., for securing messages, as well as many communication methods such as websockets, MQTT, webhooks, etc., that can be used to setup a communication session.

As a detailed example, the touchless QR code 107 could include a security token and an individualized kiosk topic (not shown) that was generated uniquely per session by kiosk touchless library 108. The kiosk application 106 could setup a subscribe mechanism with synchronizing server 112 to receive messages on this messaging topic. Any messages sent to synchronizing server 112 to be routed to the unique kiosk topic as registered by kiosk computing device 104 would be expected to be encrypted with the security token known only to the kiosk computing device 104 and the user device 102 scanning the touchless QR code 107 after loading client/counterpart web page 119. The kiosk application 106 would diligently wait for a mobile device 102 to attempt a connection. Once a mobile device 102 scans the touchless QR code 107 on kiosk computing device 104 and loads the client/counterpart web page 119, a communication handshake with the kiosk computing device 104 would be attempted. The client/counterpart web page 119 could use the mobile touchless library 121 to facilitate a handshake with the kiosk computing device 104 through security server 112 so long as the user device 102 and the client/counterpart web page 119 together can construct the correct security token by way of the scanned touchless QR code 107 and any other cryptographic steps. If the handshake succeeds, the kiosk computing device 104 and the user device 102 are paired and able to communicate via synchronizing server 112. If more than one user device or outside session attempts to connect to the kiosk, the communication session could be torn down altogether, mitigating digital sniffing.

Security server 114 conducts a number of security checks. For example, one check may be to enforce "one-to-one" exclusivity between a mobile device 102 and a kiosk computing device 104. If more than one mobile device attempts to connect, the security server 114 could, as a security precaution, tear down the connection the kiosk computing device 104 set up. Another such check could be to monitor for malicious agents trying to connect over and over and/or failing handshake protocols. The security server could blacklist IP addresses as a security precaution.

The operation of system 100 is further described with respect to FIGS. 2A-E.

Figure 2A:
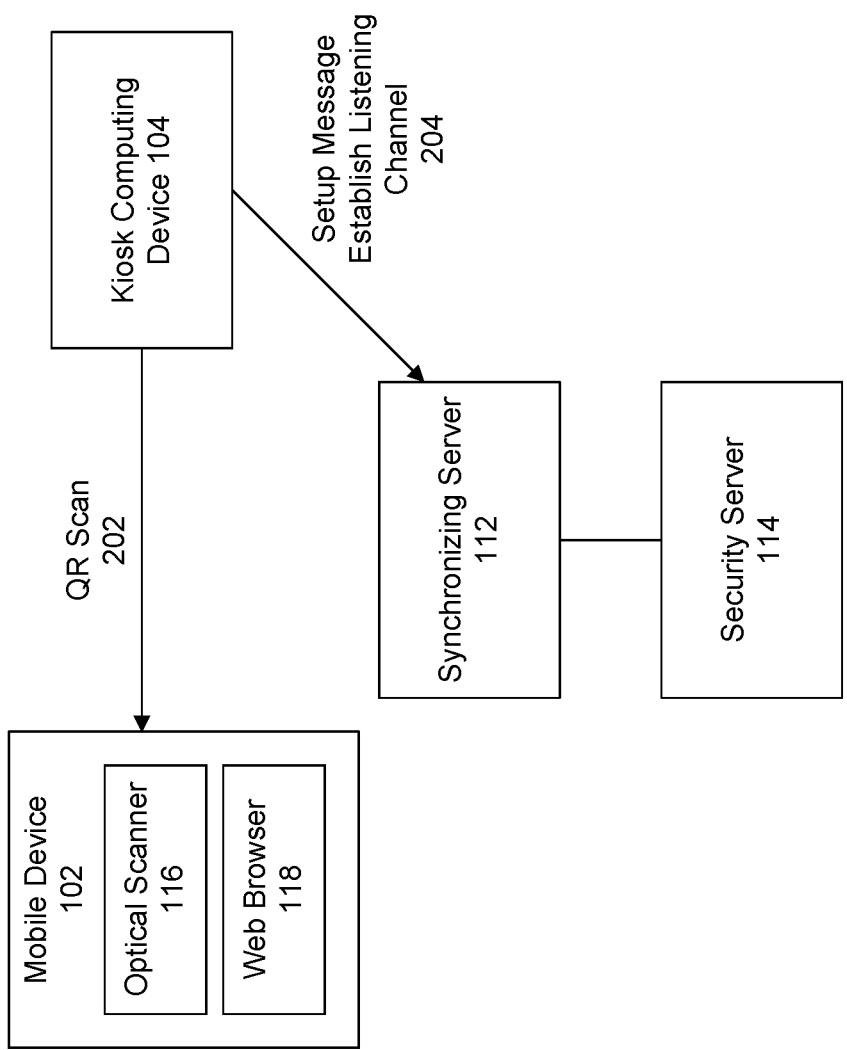
FIGS. 2A-E are diagrams illustrating data flows between various components of the system in FIG. 1.

FIG. 2A illustrates creation of a touchless session. To create the touchless session, kiosk computing device 104 may display a QR code as part of its interface as illustrated with respect to FIG. 3.

Figure 3:
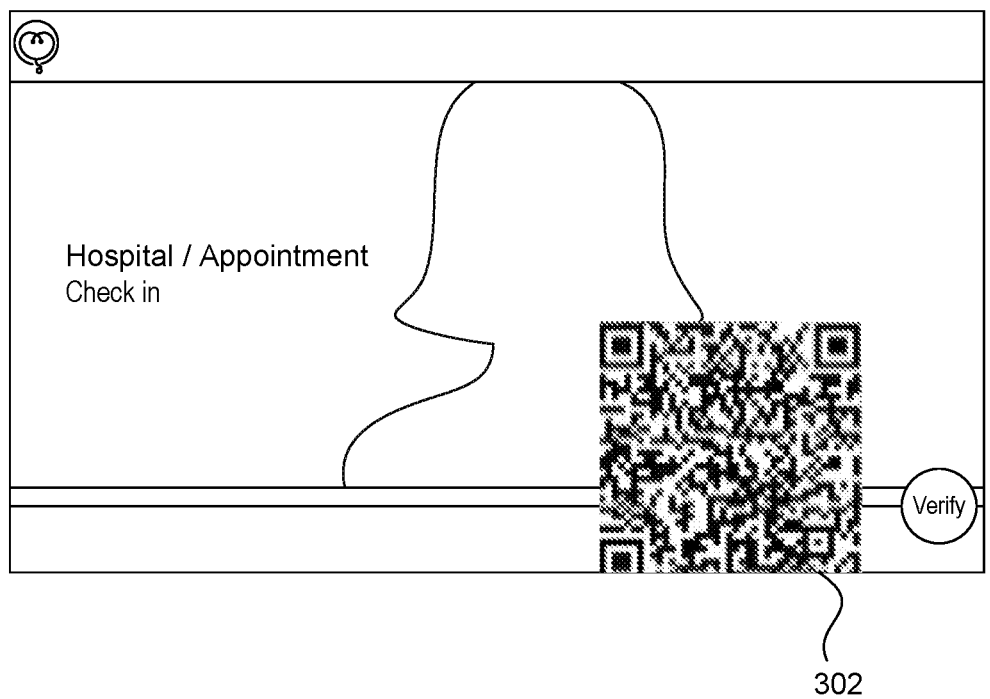
FIGS. 3 and 4A-B are diagrams illustrating user interfaces of a kiosk computing device and a mobile device.

FIG. 3 illustrates an interface 300 for a medical check-in kiosk. Interface 300 may, for example, be presented in the lobby of a doctor or medical professional's office. Interface 300 includes a QR code 302. QR code 302 may encode a link identifier and a security token. As described above, the security token may be a random or pseudorandom number generated by kiosk computing device 104. The security token may, in one example, be a parameter in the link identifier. For example, QR code 302 may have a URL, and other parameters including a security token.

Returning to FIG. 2A, when kiosk computing device 104 generates QR code 302, it may send a setup message 204 to synchronizing server 112. The setup message 204 may indicate to synchronizing server 112 to expect a connection request. Synchronizing server 112 may also register the setup with the security server 114.

Displaying interface 300 and QR code 302, a user of mobile device 102 may direct optical scanner 116 to conduct QR scan 202 of kiosk computing device 104. QR scan 202 may be an image capture by optical scanner 116 of QR code 302 displayed on interface 300. Optical scanner 116 decodes QR code 302 to identify a link identifier and security token embedded therein. Optical scanner 116, having decoded QR code 302, may send the link identifier and security token to web browser 118, as illustrated in FIG. 2A.

Figure 2B:
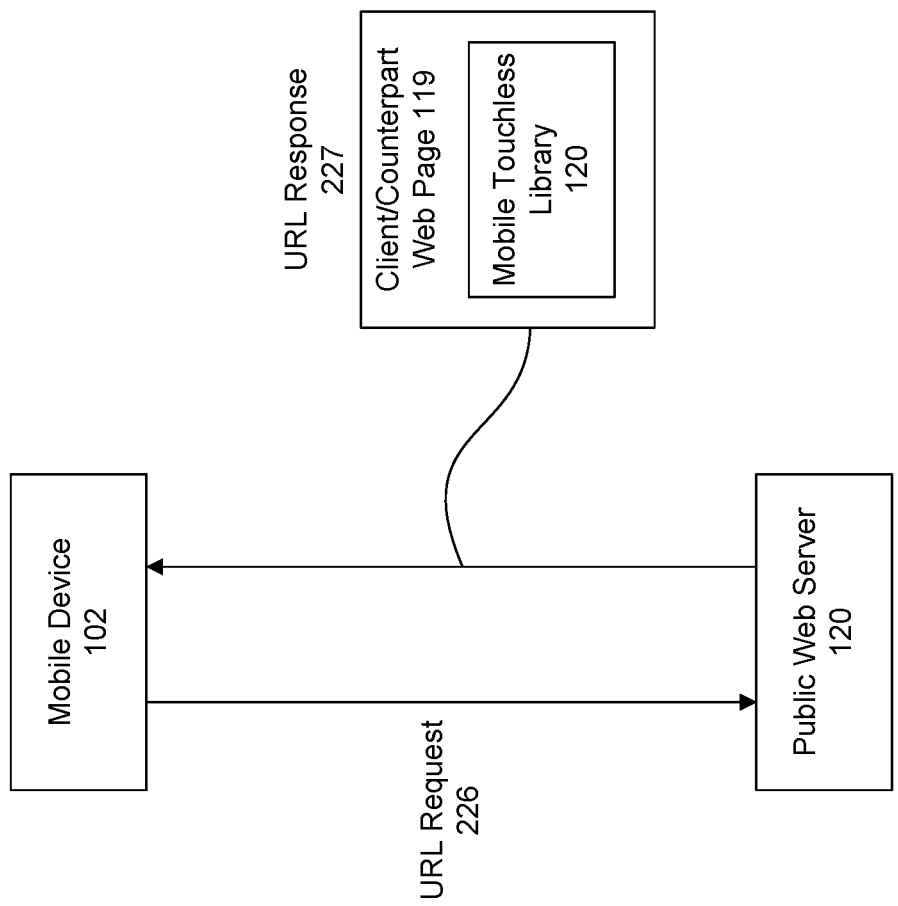

FIG. 2B illustrates how the mobile device 102 begins loading initial content. The content request is made via an HTTP or HTTPS URL request, and the public web server 120 responds with at least an initial client/counterpart web page 119 and mobile touchless library 121. Once a communication session between the user device 102 and the kiosk computing device 104 is established as described by FIG. 2C, the client/counterpart web page 119 may need to enriched with additional UI or library content to be provided by the kiosk application 106 as described by FIG. 2D.

Figure 2C:
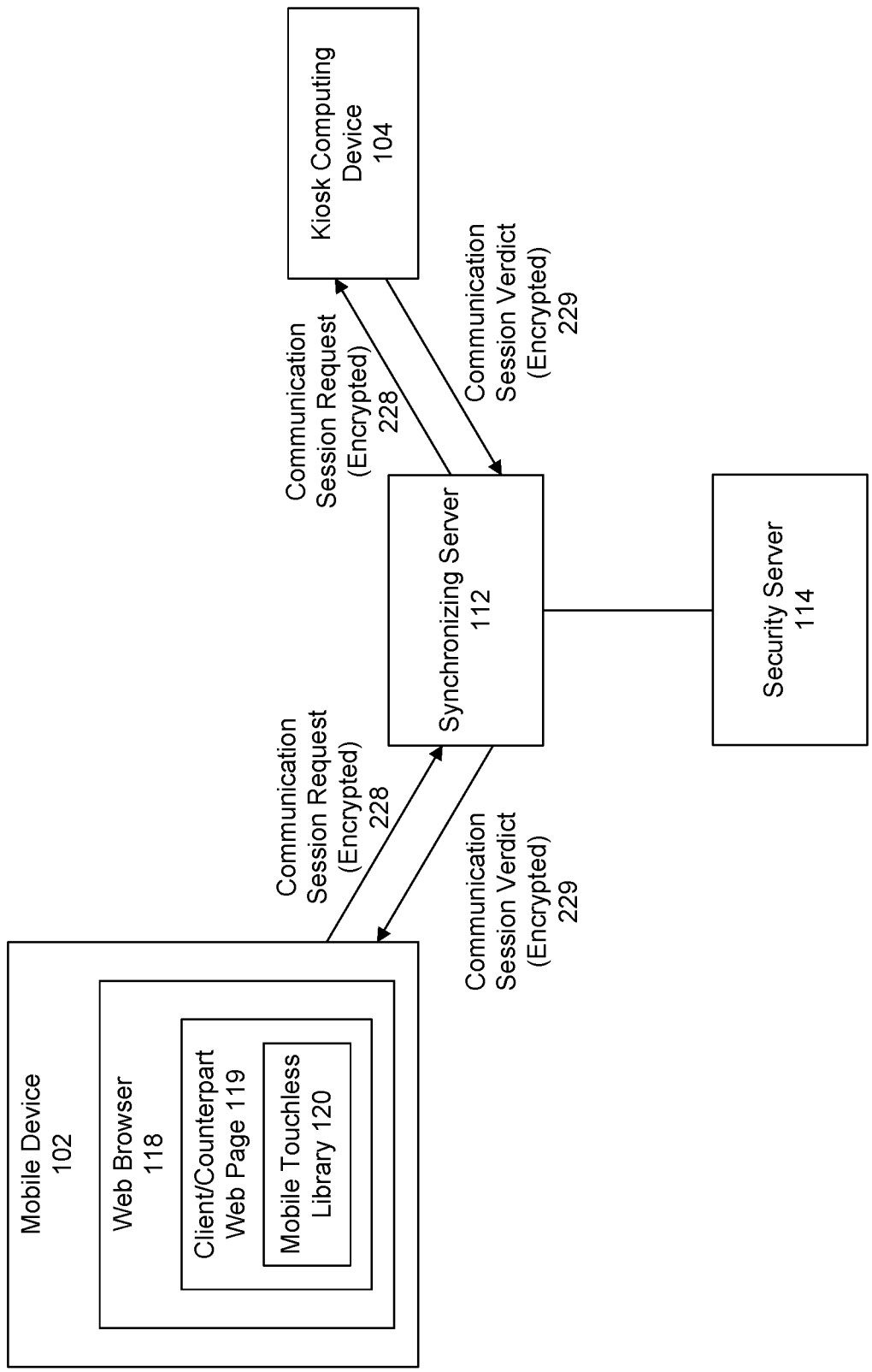

FIG. 2C illustrates how a communication session is established between the mobile device 102 and the kiosk computing device 104. By this point, the mobile device 102 has been provisioned with a client/counterpart web page 119, a mobile touchless library 121, and a security code as gleaned from QR code 302. The mobile device 102 will attempt to connect to the synchronizing server through an encrypted message by way of a communication session request 228 which is passed through to the kiosk computing device 104. After decryption by way of kiosk touchless library 108, the kiosk computing device 104 returns an encrypted verdict to the mobile device 102 through a communication verdict message 229. If the verdict was successful, the mobile device 102 and the kiosk computing device 104 now have a secure end-to-end, encrypted communication session to send content, libraries, and messages as described by FIGS. 2D and 2E.

Figure 2D:
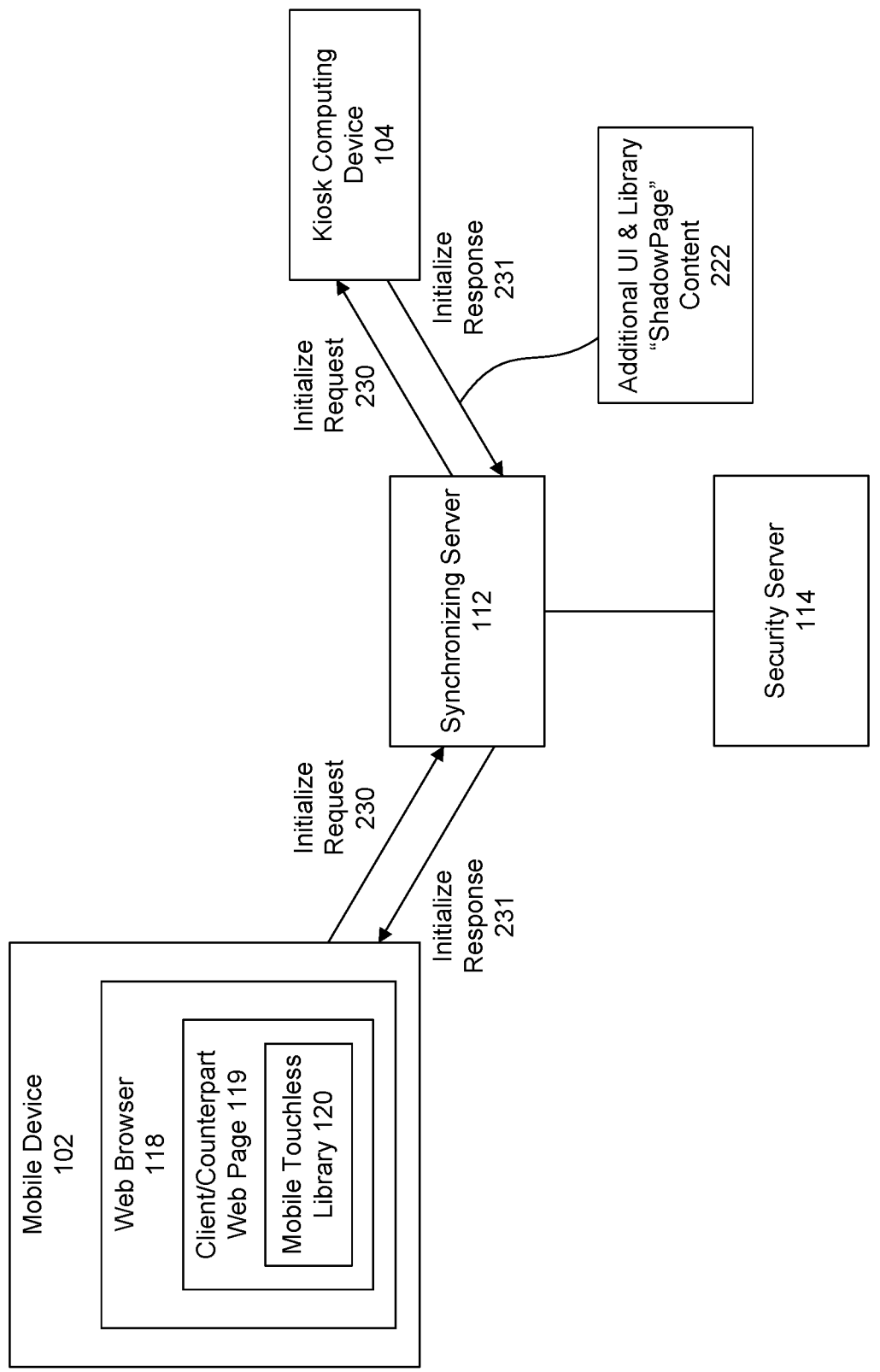

FIG. 2D illustrates how additional UI and library content presented in kiosk computing device 104 gets set up on mobile device 102. This additional content, coined "shadow page content," represents the rest of the data necessary for the client/counterpart web page 119 to "shadow" or shadow the kiosk content as shown in sample application FIG. 4B. An initialize request 230 is sent by the client/counterpart web page 119 via the mobile touchless library 121 to the kiosk computing device 104 through the synchronization server 112. The kiosk computing device 104 will return additional encrypted content and encrypted libraries that may not have been present in the initial client/counterpart web page 119 such as fields, values, and libraries that are obscured or specialized for this session. It is worth noting that only the mobile device 102 and kiosk computing device 104 have the information necessary to encrypt and decrypt these messages, providing point-to-point encryption.

Figure 4B:
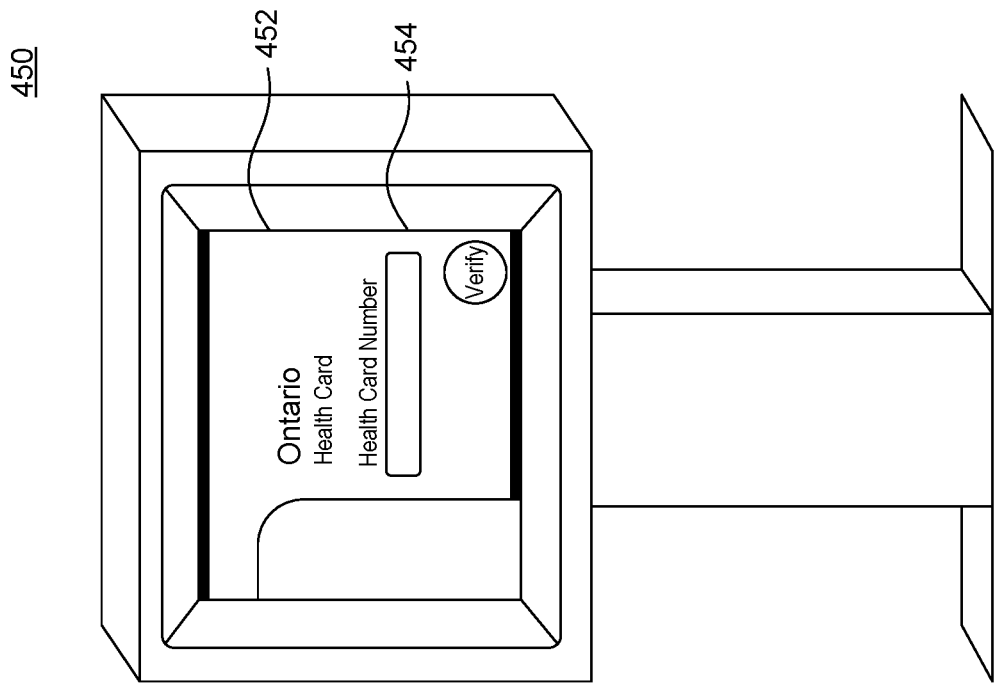
Figure 4A:
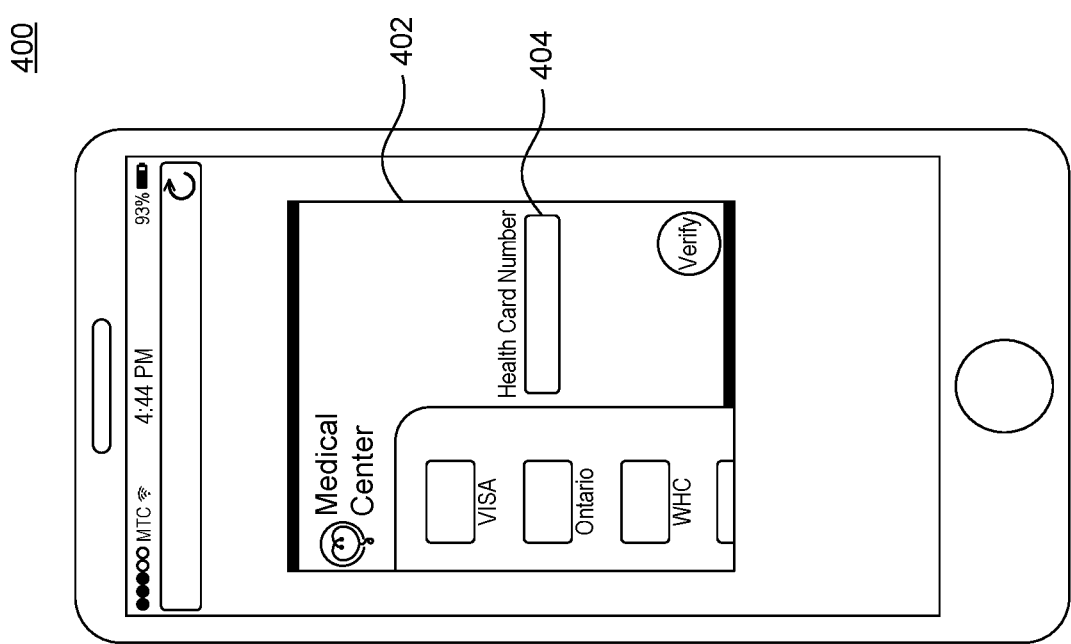

FIG. 4A illustrates a mobile device 400 and FIG. 4B illustrates a kiosk computing device 450. Mobile device 400 illustrates an interface 402 that corresponds to an interface 452 displayed on kiosk computing device 450. Interface 402 has an input field 404 that corresponds to an input field 454. While displaying similar information and input fields, interface 402 has been reformatted from interface 452, given the different screen size and orientation between mobile device 400 and kiosk computing device 450.

Figure 2E:
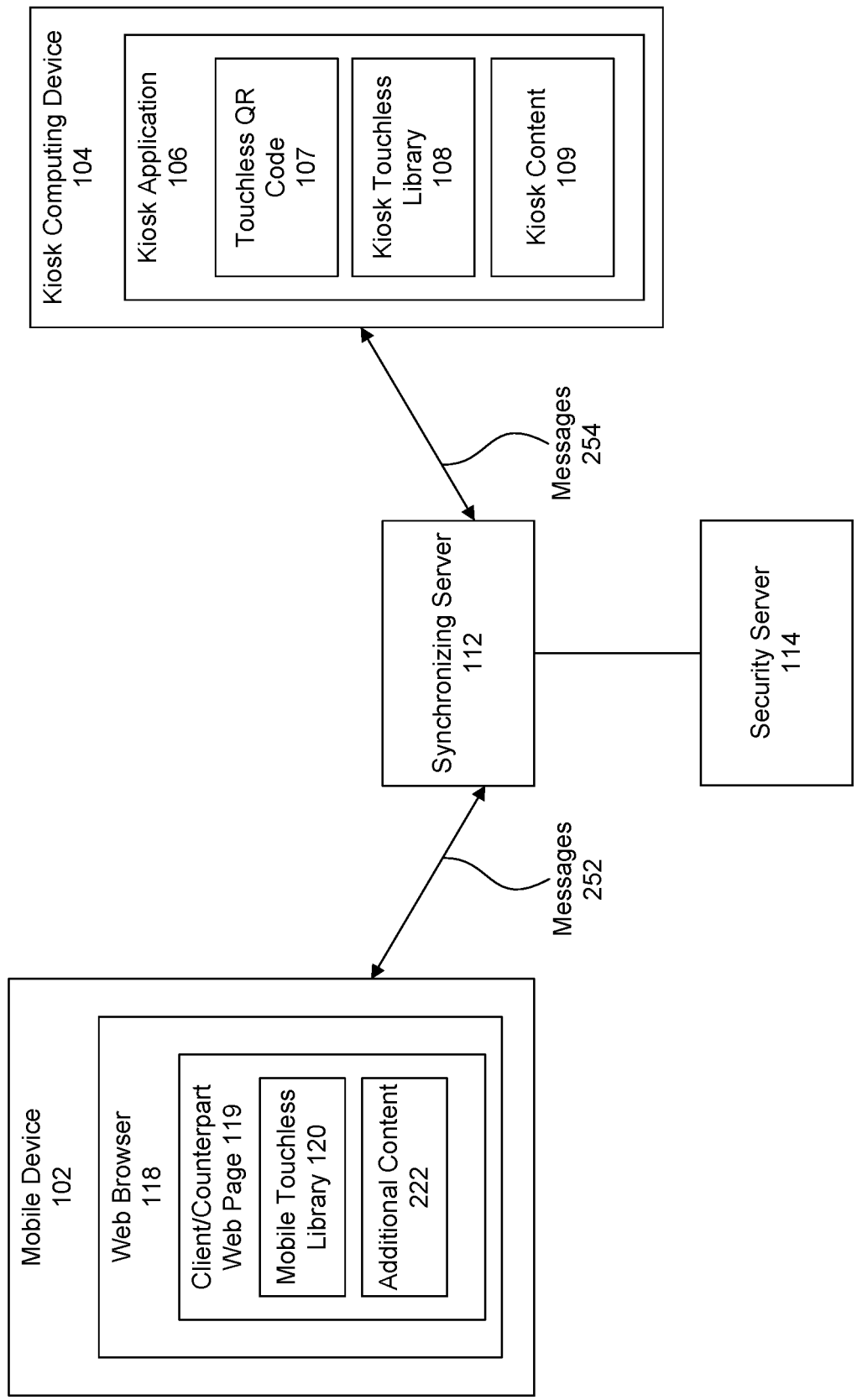

FIG. 2E shows the mobile device 102 now has content that has been served from a web browser 118 combined with content that has been served from the kiosk computing device 104. Similar to kiosk touchless library 108 in FIG. 1, mobile touchless library 121 may be a JavaScript library. Mobile touchless library 121 and subsequent shadow page library content from 222 may include scripting commands that periodically or intermittently evaluate the document object model of the client/counterpart web page 119 to determine whether an update has been made. When an update has been identified, mobile touchless library 121 or additional shadow page content libraries from additional content 222 may send a message to update the corresponding field on kiosk computing device 104 as illustrated with respect to FIG. 2E.

FIG. 2E includes a diagram 250 that shows messages 252 and 254 being passed between mobile device 102 and kiosk computing device 104. Messages 252 and 254 may be transmitted over the secure connection between mobile device 102 and kiosk computing device 104. The connection may be a socket-based connection either directly between mobile device 102 and kiosk computing device 104 or between two different socket connections to synchronizing server 112, which can act as an intermediary between mobile device 102 and kiosk computing device 104.

Messages 252 and 254 communicate events and updates to corresponding input fields in kiosk computing device 104 and mobile device 102. For example, looking to FIGS. 4A and 4B, when a user makes an input into input field 454 on interface 452 (on the kiosk computing device 450), messages 254 and 252 communicate that update to the mobile device, which updates field 404 on interface 402 to display the updated information. Similarly, when a user makes an input into field 404 on interface 402 (on the mobile device), messages 254 and 252 communicate that update to the kiosk, which updates field 454 on interface 452 to display the updated information.

In one embodiment, messages 252 and 254 may communicate updates every time a user makes a keystroke on the respective interfaces. In another embodiment, messages 252 and 254 may communicate updates when a user navigates to a new field on the respective interfaces. In yet another embodiment, messages 252 and 254 may communicate updates periodically, perhaps every several seconds.

It is possible for collisions to occur when, for example, a user makes a change to a field on one device before an update on the other device has been propagated through to the corresponding field. A skilled artisan would recognize that mobile device 102, kiosk computing device 104, and synchronizing server 112 may implement various different collision resolution methods.

One such method for resolving collisions may be to measure time difference between mobile device 102 and kiosk computing device 104 during the communication setup phase shown in FIG. 2C. Whenever an update is made, messages 252 and 254 include a timestamp indicating when the update was made that can be adjusted appropriately for mobile or kiosk time depending on the receiver. Touchless libraries 108 and 121 will receive the timestamp. When any conflicting updates occur, touchless libraries 108 and 121 may use the timestamp to enter the earliest update or latest update in the input field, disregarding the other updates.

Figure 5:
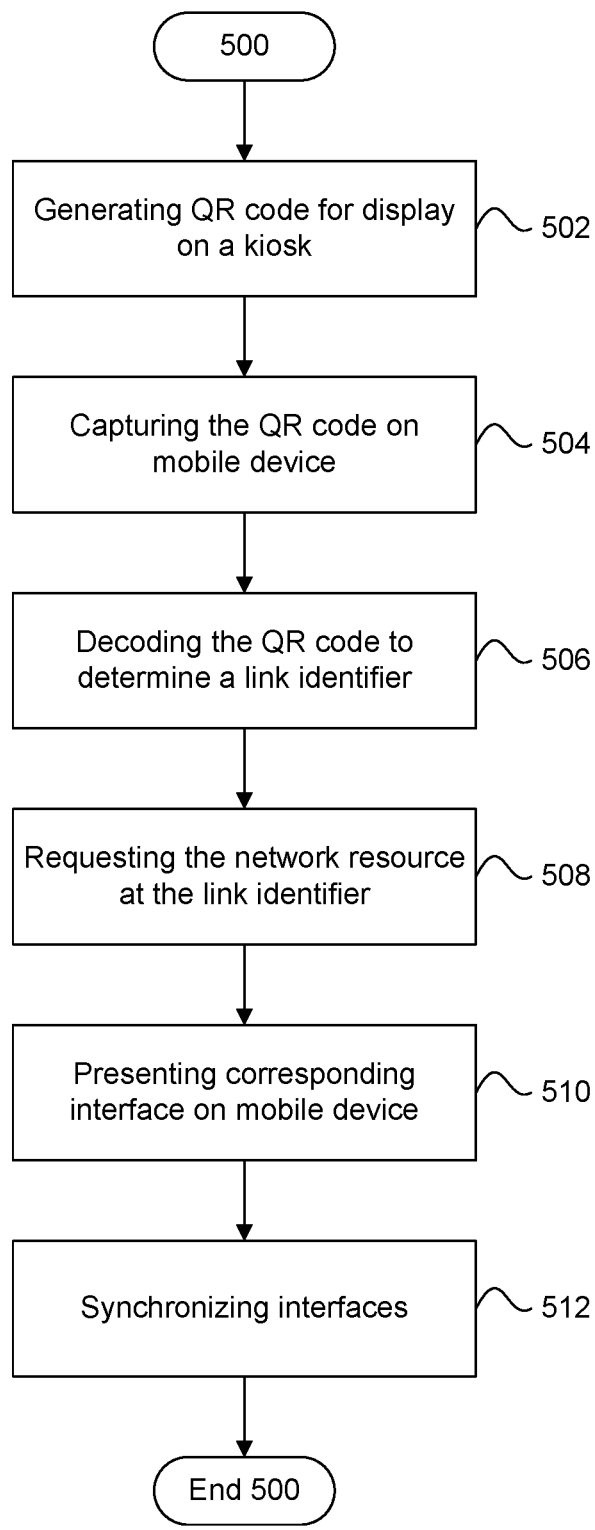
FIG. 5 is a flowchart illustrating a method for enabling contactless access to a kiosk computing device according to an embodiment.

FIG. 5 is a flowchart illustrating a method 500 for enabling contactless access to a kiosk computing device according to an embodiment.

At step 502, a machine-readable optical label is generated for display on the kiosk computing device. In addition to the machine-readable optical label, the kiosk computing device displays a graphical user interface including at least one input field. The at least one input field can be displayed on the same page as the optical label or on a different page.

At step 504, a mobile device captures the machine-readable optical label. An application on the mobile device may activate a camera on the mobile device and analyze images coming in from the camera to detect the optical label. When detected, the application may capture the image.

At step 506, the mobile device decodes the machine-readable optical label to determine a link identifier. The mobile device may also decode a security token from the optical label.

At step 508, the mobile device requests, over a network, a network resource addressed by the link identifier. In response to the request, the network resource (which may be the kiosk or another intermediate server) transmits to the mobile device a page that is able to be rendered and executed on a web browser on the mobile device. The page includes executable code which is such that, when the web browser executes the page, the web browser transmits data from the second input field to appear in the first input file. The page also specifies a graphical user interface that corresponds to the graphical user interface presented on the kiosk computing device. In particular, the page includes input fields that correspond to the respective input fields presented on the kiosk computing device.

At step 510, the mobile device presents the graphical user interface specified in the page. In particular, a web browser on the mobile device renders the page and presents it to a user on a display of the mobile device.

At step 512, the graphical user interface of the mobile device and the graphical user interface of the kiosk computing device are synchronized. In particular, the interfaces are synchronized such that, when the user enters information on an input field on one of the interfaces, the information appears on the corresponding input field of the other interface. To synchronize the interfaces, a connection may be created between a client on the mobile device and a server on the kiosk computing device. Information entered by the user in the respective fields may be transmitted via the connection. This transmission may occur repeatedly with messages specifying the updated information. The messages may be transmitted as updated information is entered by user.

To avoid collisions, when the connection is set up, time clocks on the mobile device and kiosk computing device may be synchronized. Then, collisions may be resolved using the synchronized first and second time clocks.

The databases disclosed herein may be any stored type of structured memory, including a persistent memory. For example, this database may be implemented as a relational database or file system. Mobile device 102, kiosk computing device 104, mobile device 400, kiosk computing device 450, synchronizing server 112, and security server 114 each include processors and memory, including a nonvolatile computer readable medium for storing processing instructions thereon. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. To carry out its programmed functionality, the devices may have various modules implemented in hardware, software, firmware, or any combination thereof.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for enabling contactless access to a kiosk computing device, comprising:
 (a) generating for display on the kiosk computing device a machine-readable optical label, the kiosk computing device displaying a first graphical user interface including a first input field, the machine-readable optical label encoding a link identifier addressing a network resource;
 (b) receiving, over a network, a request for the network resource addressed by the link identifier; and
 (c) in response to the request in (b), transmitting for presentation on a mobile device a second graphical user interface that includes a second input field corresponding to the first input field; and
 (d) synchronizing the first and second graphical user interfaces such that, when a user enters information on the second input field in the second graphical user interface, the information appears on the first input field in the first graphical user interface, wherein the synchronizing (d) comprises:
  (i) creating a connection between a client on the mobile device and a server on the kiosk computing device,
  (ii) receiving, via the connection, a first message with first updated information in the second input field on the mobile device, as the first updated information is entered by the user,
  (iii) transmitting, via the connection, a second message with second updated information in the first input field on the kiosk, as the second updated information is entered by the user,
  (iv) synchronizing a first time clock on the mobile device with a second time clock on the kiosk, and
  (v) resolving a collision between the first and second messages using the synchronized first and second time clocks.

2. The method of claim 1, wherein the transmitting (c) comprises transmitting a page that is able to be rendered and executed on a web browser on the mobile device such that, when the web browser executes the page, the web browser transmits data from the second input field to appear in the first input field.

3. The method of claim 1, wherein the synchronizing (d) comprises synchronizing the first and second graphical user interfaces such that, when the user enters information on the first input field in the first graphical user interface, the information appears on the second input field in the second graphical user interface.

4. The method of claim 1, wherein the link identifier is a uniform resource locator, and wherein the network resource is a service that creates the connection in (d)(i).

5. The method of claim 1, wherein the machine-readable optical label further encodes an embedded security token, wherein the request includes a parameter, further comprising, in response to the request in (b):
 (e) comparing the parameter to the embedded security token to synchronize the first and second graphical user interfaces in (d).

6. The method of claim 1, wherein the machine-readable optical label is a Quick Response code.

7. The method of claim 1, further comprising reformatting the first graphical user interface for a screen of the mobile device to generate the second graphical user interface.

8. A non-transitory computer-readable device having instructions stored thereon that, when executed by at least one computing device, cause the at least one computing device to perform operations enabling contactless access to a kiosk computing device, the operations comprising:
 (a) generating for display on the kiosk computing device a machine-readable optical label, the kiosk computing device displaying a first graphical user interface including a first input field, the machine-readable optical label encoding a link identifier addressing a network resource;
(b) receiving, over a network, a request for the network resource addressed by the link identifier; and
(c) in response to the request in (b), transmitting for presentation on a mobile device a second graphical user interface that includes a second input field corresponding to the first input field; and
(d) synchronizing the first and second graphical user interfaces such that, when a user enters information on the second input field in the second graphical user interface, the information appears on the first input field in the first graphical user interface, wherein the synchronizing (d) comprises:
 (i) creating a connection between a client on the mobile device and a server on the kiosk computing device,
 (ii) receiving, via the connection, a first message with a first updated information in the second input field on the mobile device, as the first updated information is entered by the user,
 (iii) transmitting, via the connection, a second message with a second updated information in the first input field on the kiosk, as the second updated information is entered by the user,
 (iv) synchronizing a first time clock on the mobile device with a second time clock on the kiosk, and
 (v) resolving a collision between the first and second messages using the synchronized first and second time clocks.

9. The device of claim 8, wherein the transmitting (c) comprises transmitting a page that is able to be rendered and executed on a web browser on the mobile device such that, when the web browser executes the page, the web browser transmits data from the second input field to appear in the first input field.

10. The device of claim 8, wherein the synchronizing (d) comprises synchronizing the first and second graphical user interfaces such that, when the user enters information on the first input field in the first graphical user interface, the information appears on the second input field in the second graphical user interface.

11. The device of claim 8, wherein the link identifier is a uniform resource locator, and wherein the network resource is a service that creates the connection in (d)(i).

12. The device of claim 8, wherein the machine-readable optical label further encodes an embedded security token, wherein the request includes a parameter, further comprising, in response to the request in (b):
 (e) comparing the parameter to the embedded security token to synchronize the first and second graphical user interfaces in (d).

13. The device of claim 8, wherein the machine-readable optical label is a Quick Response code.

14. The device of claim 8, further comprising reformatting the first graphical user interface for a screen of the mobile device to generate the second graphical user interface.

15. A computer-implemented method for enabling contactless access to a kiosk computing device, comprising:
(a) capturing, on a mobile device, a machine-readable optical label displayed on the kiosk computing device, the kiosk computing device displaying a first graphical user interface including a first input field;
(b) decoding, on the mobile device, the machine-readable optical label to determine a link identifier;
(c) requesting, over a network, a network resource addressed by the link identifier; and
(d) in response to receipt of the network resource requested in (c), presenting, on the mobile device, a second graphical user interface that includes a second input field corresponding to the first input field;
(e) synchronizing the first and second graphical user interfaces such that, when a user enters information on the second input field in the second graphical user interface, the information appears on the first input field in the first graphical user interface, wherein the synchronizing (e) comprises:
 (i) creating a connection between a client on the mobile device and a server on the kiosk computing device,
 (ii) transmitting, via the connection, a first message with a first updated information in the second input field on the mobile device, as the first updated information is entered by the user,
 (iii) receiving, via the connection, a second message with a second updated information in the first input field on the kiosk, as the second updated information is entered by the user,
 (iv) synchronizing a first time clock on the mobile device with a second time clock on the kiosk, and
 (v) resolving a collision between the first and second messages using the synchronized first and second time clocks.

* * * * *